United States Patent [19]

Friedman

[11] 4,330,564

[45] May 18, 1982

[54] FRYER OIL TREATMENT COMPOSITION AND METHOD

[76] Inventor: Bernard Friedman, 2914 Fairview St., Allentown, Pa. 18104

[21] Appl. No.: 69,238

[22] Filed: Aug. 23, 1979

[51] Int. Cl.[3] .............................................. A23D 5/02

[52] U.S. Cl. .................................... 426/417; 426/423; 426/442

[58] Field of Search ............... 426/271, 254, 417, 262, 426/423, 442; 260/424, 428

[56] References Cited

U.S. PATENT DOCUMENTS

| | | | |
|---|---|---|---|
| 1,856,571 | 5/1932 | Lourens | 260/424 |
| 3,203,754 | 8/1965 | Young et al. | 8/142 |
| 3,231,390 | 1/1966 | Hoover | 426/417 |
| 3,233,740 | 2/1966 | Linden et al. | 210/500 |
| 3,335,869 | 8/1967 | Hedges | 210/500 |
| 3,562,301 | 2/1971 | Fryer et al. | 260/398.5 |
| 3,590,059 | 6/1971 | Velan | 260/423 |
| 3,895,042 | 7/1975 | Taylor | 260/428 X |
| 3,947,602 | 3/1976 | Clewell, Jr. et al. | 426/417 |
| 3,954,819 | 5/1976 | Husch | 426/417 X |
| 3,996,158 | 12/1976 | Cohen | 252/378 |
| 4,089,880 | 5/1978 | Sullivan | 260/424 |
| 4,112,129 | 9/1978 | Duensing et al. | 426/417 |
| 4,150,045 | 4/1979 | Sinha | 260/424 |

FOREIGN PATENT DOCUMENTS

| | | |
|---|---|---|
| 920349 | 3/1963 | United Kingdom . |
| 1002974 | 9/1965 | United Kingdom . |

OTHER PUBLICATIONS

Perlite, "New Product for Industrial Uses", Great Lakes Carbon Corp., 630 Shatto Place, LA. Ca. 90005.

Celite Technical Data, Johns-Manville Filtration and Minerals Div., Greenwood Plaza, Denver, Col. 80217.

Clarid, The Clarid Co., 10719 Sandpiper, Houston, Texas 77096, Oct. 12, 1976.

*Primary Examiner*—Robert A. Yoncoskie

*Attorney, Agent, or Firm*—Lerner, David, Littenberg & Samuel

[57] ABSTRACT

A composition comprising water, food compatible acid and porous rhyolite carrier, and a method of treating used fryer cooking oil are disclosed.

13 Claims, No Drawings

FRYER OIL TREATMENT COMPOSITION AND METHOD

BACKGROUND OF THE INVENTION

The invention relates to a composition and method which are useful for removing certain impurities from certain organic liquids. More particularly, the invention relates to a composition and method which are useful for treating fats and oils, especially used fryer cooking oil.

During use, cooking oil has a tendency to decompose to some extent thereby forming fatty acids in the oil. In addition, the cooking oil picks up particulate and soluble contaminates and food juices from the food being fried. These impurities in the cooking oil cause certain undesirable properties in the used oil. Specifically, with a cooking oil which has been thus contaminated from use, the frying properties of the oil are degraded. For example, the food fried with such contaminated oil many times becomes too browned on the outside before it is properly cooked on the inside. Also, used cooking oil with certain contaminants of as low as 12 ppm resulting from food juices and/or the interaction of food juices with fatty acids, has a tendency to foam "or boil" while cooking, which is undesirable. In addition, with as little as 6 ppm of such contaminants, the used cooking oil tends to have oleophilic properties with food, thus leaving oily residues on the surface of the fried food product. All of these properties are normally considered undesirable.

Thus, a desirable cooking oil is one which produces a fried food product browned on the outside and properly cooked on the inside and which has oleophobic properties with food leaving the food with minimum oily residues on the surface of the food product. Moreover, if such a cooking oil could be quickly and economically obtained by treating contaminated used cooking oil to restore and/or maintain such desirable properties in the used cooking oil, it would be highly advantageous.

Various compositions and methods have been used in the past in attempts to remove impurities from fats and oils. For example, treated diatomaceous earth materials, i.e., synthetic silicates, have been recently marketed under the trade name "Micro Sweet Filter Aid" as materials to be added to used cooking oil for the removal of impurities therefrom. This material, however, requires the use of a filter cake.

A method for treating cooking oil is also disclosed in U.S. Pat. No. 3,947,602 in which the cooking oil is contacted with a food compatible acid, followed by separation of the oil and the acid prior to reuse of the oil. The method is said to increase the useful lifetime of the cooking oil.

A porous pumicite filter aid is disclosed in U.S. Pat. No. 3,996,158. This porous pumicite material is said to be useful for washing dry cleaning solvents so as to retain a low ratio of non-volatile matter therein.

The compositions discussed above for the treatment of fats and oils have certain disadvantages. For example, compositions employing activated carbon are hard to filter thoroughly, making it difficult to remove the material from treated oil with facilities normally available in a restaurant kitchen. Others of the above methods require the use of a filter cake with a filter machine to accomplish the filtering step, while others do not provide maximum removal of impurities from the used cooking oil. Still others require long time periods for treatment which make them economically disadvantageous. Therefore, it would be very desirable to provide a composition overcoming these disadvantages and having the ability to remove undesirable impurities from and to restore desirable cooking properties to used cooking oil, which composition could be simply added to the hot, contaminated cooking oil and thereafter filtered from the cooking oil in an economically suitable time without the need for the formation of a filter cake with a filter machine.

SUMMARY OF THE INVENTION

It has now been found that these and other desirable characteristics are provided by a composition comprising water, food compatible acid and porous rhyolite or perlite carrier. It has been found that this composition can be added directly to used hot cooking oil. The composition of the invention removes or neutralizes the effect of certain undesirable impurities from the used cooking oil, such as soluble food juices and fatty acids which have an adverse effect on the cooking oil, especially as regards the oil's useful lifetime and cooking characteristics. For example, in comparison to untreated oil, the composition of the invention has been found to reduce the quantity of oil used from about 10 to 50 percent. Also, the composition provides a restored cooking oil which has very desirable properties, i.e., food can be properly browned on the outside, while also allowing proper cooking of the inside of the food. In addition, it has been reported that, by use of the composition of the invention, deposits that frequently build up on the inside of fryer pots are almost totally prevented from occurring. Moreover, in situations where such build-up has occurred in the past, it is frequently removed by the composition of the invention. This results in a cleaner, more efficient frying device. Furthermore, oil treated with the composition of the invention has been found to provide oleophobic properties with food, allowing fried food products without the oily residue found on such products prior to treatment of the oil with the composition of the invention. Still further since the compositions of the invention diminishes the effect of certain colored material from used cooking oil, they may be removing possibly toxic materials. Still further, the composition of the invention provides easy filtration once the treatment has been completed. In fact, there is no absolute need for the filter cake or filter machine with the composition of the invention. Rather, a simple hand filtration step is all that is required. All of the above factors make the composition of the present invention a fast, convenient and economical means for extending the lifetime of cooking oil.

The present invention also includes a composition comprising porous rhyolite carrier and water. The composition preferably contains sufficient water such that, when the composition is contacted with hot fats and oils above the boiling point of water, the water steams and disperses the composition throughout the oil. Preferably, the composition contains from about 33 to about 75 percent by weight water. This composition can be used in the treatment of food contaminated cooking oil, and in addition, in the production of cooking oil.

A process for treating used fryer cooking oil is also provided in which used fryer cooking oil having a temperature of from about 300° to about 400° F. is contacted with a composition comprising water, food compatible acid and porous carrier, wherein the carrier has sufficient porosity to sorb the water and release it when the composition is contacted with the hot oil. The residue of the composition is then removed from the oil, leaving a fryer oil having the desirable cooking properties discussed above. In such a process, it is preferred to use the composition described above containing the food compatible acid, water and porous rhyolite or perlite carrier.

DETAILED DESCRIPTION OF THE INVENTION

In a preferred embodiment of the invention, the composition includes water in an amount such that, when the composition of the invention is contacted with the hot oil, some of the water steams and disperses the composition throughout the oil. Preferably, this occurs without causing substantial spattering of the oil. The composition also preferably includes an amount of the porous rhyolite or perlite carrier sufficient to sorb the water and to release the sorbed water at temperatures above the boiling point of the water. If used to treat used cooking oil, the composition should contain sufficient amounts of the food compatible acid and porous carrier to restore the desirable cooking properties to contaminated, used oil as described above. The exact formulation of the composition of the invention, however, will vary greatly depending upon a number of factors, including the type of oil being treated, the quantity and type of food contaminants, the porous carrier being used, the food compatible acid being used and the temperature of the oil being treated. Preferably, the composition of the invention comprises from about 33 to about 75 percent by weight of solution and from about 67 to about 25 percent by weight porous carrier. The above-mentioned solution may contain from about 2 to 10 percent by weight of the food compatible acid. More preferably, the solution may contain from about 4 to about 6 percent by weight food compatible acid.

Suitable food compatible acids for use in the present invention include citric acid, tartaric acid, acetic acid, phosphoric acid, malic acid and mixtures thereof. A preferred food compatible acid is citric acid.

Porous carriers for use in the above described composition of the invention include any of the well-known heat expanded, porous rhyolite or perlite materials well-known in the art. Such rhyolites include the glassy rhyolites such as pumicite obsidian and pitchstone. These materials are made porous by methods also well-known in the art, i.e., by heat expansion. Typically, the raw rhyolite materials are first heated to remove substantially all of the free moisture content of the material. The dried material is then directed to a "popper" where the material is exposed to the flame of a gas jet at a temperature generally in the range of 1480° C. The rhyolite material is then allowed to expand to produce the porous rhyolite carrier material used in the present invention. Such porous rhyolite or perlite carrier material generally has a low density and a spherical shape. Preferably, the material has sizes in the range of from about 8 to about 120 mesh, more preferably, from about 20 to about 80 mesh, and most preferably, from about 40 to about 60 mesh.

The rhyolite or perlite material used in the present invention should be sufficiently porous so that it can sorb the water and thereafter release it at a temperature above the boiling point of the water. It should be noted, however, that not all of the water may be adsorbed and/or absorbed on the porous rhyolite carrier. Some of the water may exist in its free state in the composition of the invention.

The porous rhyolite or perlite carrier used in the present invention should also have characteristics which help avoid caking. Preferably, the carrier particles should have a generally spherical shape and a sufficient size to avoid caking. A preferred porous rhyolite material is porous pumicite.

In the process of the invention, other porous carrier materials can be used. For example, suitable carrier materials for use in the process of the invention include activated carbon, fuller's earth, silica gel, bauxite, alumina and diatomaceous earth, in addition to the porous rhyolite or perlite materials disclosed above.

The compositions of the present invention can be prepared by any of the methods well-known in the art for mixing. For example, the components of the composition of the invention can be simply mixed with a ribbon blender or a tumbling blender.

The use of the composition of the present invention is very advantageous since it can be simply added to hot oil. The amount of the composition added varies greatly depending upon a large number of factors, including the amount of impurities in the oil, the type of oil being treated, the temperature of the oil, etc. Preferably, from about 30 to about 100 cc. of the composition of the present invention are added per 10 pounds of oil and most preferably, from about 60 to about 70 cc. of the composition per 10 pounds of oil.

The temperature of the oil during treatment should be such that it will cause release of the water from the porous carrier resulting in effective dispersal or distribution of the carrier throughout the hot oil. Preferably, the temperature of the treatment is in the normal range of frying temperatures, e.g., from about 300° to about 400° F., and preferably, from about 325° to about 375° F. The high temperature of the oil causes steaming and releasing of the water and food compatible acid in the composition. This steaming in turn causes jet-propelled dispersal of the composition, carrying the composition throughout the oil thereby allowing good contact between the treating composition and the oil.

The time of treatment also varies greatly depending upon a number of factors including those mentioned above, but the composition should remain in contact with the oil for a time sufficient to remove the undesirable properties of the oil being treated. The composition will remain in contact with the oil for a time sufficient to cause steaming and releasing of the water and distribution of the composition throughout the oil. Typically, the composition of the invention remains in contact with the oil for from about $\frac{1}{4}$ or $\frac{1}{2}$ minute to about 3 minutes.

Once the treatment is completed, the residue of the composition of the invention is removed from the treated oil by any of the means well-known in the art for this purpose, e.g., by filtering. Preferably, the oil is filtered hot and with a hand filter or a filter machine. Such hand filtering can be accomplished in as little as one minute for as much as 5 gallons of oil.

The treatment of the hot oil can be repeated at various intervals depending upon the uses made of the cooking oil and the other factors mentioned above. Typically, used cooking oil can be treated after each frying meal or at the end of each frying day.

Filters suitable for use with the present invention include any of those well-known in the art for this purpose. A preferred filter is the one described in U.S. Pat. No. 4,052,319. Although it is not necessary, the composition and method of the present invention can be used with a filter machine.

The following example is used for illustrating but not limiting the process of the present invention.

PREFERRED EMBODIMENT

A composition of the invention is prepared by mixing in a ribbon blender 24 pounds of porous pumicite having a density of 6 lbs/cubic foot, four gallons or 33.4 pounds of water and 2½ pounds of citric acid granules. The porous pumicite used is generally cellular siliceous glass spheres having a chemical formula basically as follows:

%$SiO_2$: 75
%$Al_2O_3$: 14
%$Fe_2O_3$: 1
%$K_2O$: 6
%$Na_2O$: 2
%Other Oxides: 1
Less on Ignition: 1
Organic Matter: nil Various samples of these compositions are added to cooking oil which has been used as a frying oil for food. The cooking oil has temperatures varying from about 300° to about 400° F. Seventy cc. of the above composition of the invention are usually added per each 10 pounds of used cooking oil. The oil is allowed to remain in contact with the composition for various time periods ranging from ¼ to 3 or 4 minutes. The oil is then filtered.

In each cases, the frying characteristics of the oil were improved. In many case, the treatment provided a cooking oil with very desirable cooking properties, i.e., an oil which provided a fried food product browned on the outside and properly cooked on the inside and which had oleophobic properties with food so that the fried food products did not have an oil residue on the browned outer portion.

Other compositions in accordance with the invention are prepared by substituting tartaric acid and phosphoric acid, respectively, for the citric acid. In addition, porous perlite can be substituted for the porous pumicite.

It will be understood that the embodiments described above are merely exemplary and that persons skilled in the art may make variations and modifications without departing from the spirit and scope of the invention. All such modifications and variations are intended to be included within the scope of the invention as defined by the appended claims.

What is claimed is:

1. A process for treating used fryer cooking oil comprising the steps of mixing said used cooking oil at a temperature of from about 300° to about 400° F. with a composition comprised of porous carrier, water and food compatible acid; and filtering the residue of said composition from said oil; wherein said sorbent and water are present in said composition in amounts sufficient to disperse the composition throughout the hot oil without substantial spattering of the oil upon said mixing, and wherein said porous carrier, water and food compatible acid are present in said composition in amounts to improve the cooking properties of the treated used cooking oil by increasing the useful cooking lifetime of the used oil and by minimizing oily residue on food products cooked with the treated used cooking oil.

2. A process for treating used fryer cooking oil comprising the steps of mixing said used cooking oil at a temperature of from about 300° to about 400° F. with a composition comprised of porous rhyolite carrier, water and food compatible acid; and filtering the residue of said composition from said oil; wherein said porous rhyolite carrier and water are present in said composition in amounts sufficient to disperse the composition throughout the hot oil without substantial spattering of the oil upon said mixing, and wherein said porous rhyolite carrier, water and food compatible acid are present in said composition in amounts to improve the cooking properties of the treated used cooking oil by increasing the useful cooking lifetime of the used oil and by minimizing oily residue on food products cooked with the treated used cooking oil.

3. A process according to claim 2, wherein said porous rhyolite carrier comprises from about 67 to about 25 percent by weight of said composition.

4. A process according to claim 1, 2 or 3 wherein said composition contains water in an amount such that, when said composition is contacted with said oil, the water steams and disperses the composition throughout the oil.

5. A process according to claim 1, 2 or 3 wherein said water and food compatible acid comprise from about 33 to about 75 percent by weight of said composition.

6. A process according to claim 5 wherein said acid comprises from about 2 to about 10 percent by weight of said water and acid in said composition.

7. A process according to claim 1, 2 or 3 wherein said food compatible acid is selected from the group consisting of citric acid, tartaric acid, acetic acid, phosphoric acid and malic acid.

8. A process according to claim 6, wherein said food compatible acid is citric acid.

9. A process according to claim 1, wherein said porous carrier is selected from the group consisting of porous pumicite and porous perlite.

10. A process according to claim 1, wherein said porous carrier is porous pumicite.

11. A process according to claim 1, wherein said porous carrier comprises from about 67 to about 25 percent by weight of said composition.

12. A process according to claim 1 or 11, wherein said porous carrier is porous pumicite and said food compatible acid is citric acid.

13. A process according to claim 1, 2 or 3 wherein said composition comprises about 56 percent by weight water, about 40 percent by weight porous pumicite and about 4 percent by weight citric acid.

* * * * *

UNITED STATES PATENT AND TRADEMARK OFFICE

CERTIFICATE OF CORRECTION

PATENT NO. : 4,330,564

DATED : May 18, 1982

INVENTOR(S) : Bernard Friedman

It is certified that error appears in the above-identified patent and that said Letters Patent are hereby corrected as shown below:

Column 5, line 58, "sorbent" should read "porous carrier".

Signed and Sealed this

*Seventeenth* Day of *August 1982*

[SEAL]

*Attest:*

GERALD J. MOSSINGHOFF

*Attesting Officer* *Commissioner of Patents and Trademarks*